3,471,416
LOW DENSITY FOAM SYSTEM FOR REFRIGERATION USE

Walter R. Fijal, Trenton, Mich., assignor to Wyandotte Chemicals Corporation, Wyandotte, Mich., a corporation of Michigan
No Drawing. Filed July 6, 1965, Ser. No. 469,923
Int. Cl. C08g 22/44
U.S. Cl. 260—2.5
9 Claims

ABSTRACT OF THE DISCLOSURE

A low density rigid foam having excellent properties prepared by mixing together (a) an addition product of a polyhydric alcohol containing from 3 to 8 hydroxyl groups with an alkylene oxide containing from 2 to 4 carbon atoms, (b) an amine which may be either tetra-(hydroxyalkyl)alkylene diamines or penta(hydroxyalkyl) alkylene triamines or both, (c) an organic polyisocyanate, (d) a wetting agent, (e) a blowing solvent, and (f) a catalyst mixture consisting of (1) an amine which may be either triethylene diamine or methyl triethylene diamine and (2) an amine which may be either dimethylethanolamine, diethylethanolamine, dipropylethanolamine, triethylamine, N-ethyl morpholine, N-methyl morpholine, and N-propyl morpholine.

---

The present invention relates to stable rigid solvent-blown, polyether-based polyurethane foams.

Polyurethane compositions are usually regarded as the reaction product of a polyisocyanate and an active hydrogen-containing organic compound, such as hydroxy-terminated polyesters, polyesteramides, or polyethers. By providing blowing solvents, having a boiling point sufficiently low to enable vaporization thereof by the heat of reaction, the polyurethane product can be obtained as a foam useful for insulation and the like.

Halogenated hydrocarbons, such as the "Freons" or "Genetrons," generally have been preferred by the prior art for this purpose. The reactions of the prior art are usually conducted in the presence of a catalytic agent, such as a tertiary amine.

Rigid polyurethane foams of the type above-described are useful for many purposes, one of which is insulation for refrigerators, freezers, and the like, wherein the material is foamed in place in the insulation space of the refrigerator, freezer, etc. In order to effect savings in cost of the foam material, it is desirable to be able to decrease the core and the over-all density, i.e., actual foam density in the refrigerator or freezer, to the greatest degree possible. The logical approach to decreasing the density is the simple addition of more blowing solvent. However, previous attempts to decrease density by increasing the amount of blowing agent resulted in poor K factors [B.t.u./(hr.) (sq. ft.) (° F./inch of thickness)], unstable foams and very little, if any, improvement in over-all foam density in the refrigerators. Also, the formulations for such foaming material require a low viscosity system with good flow characteristics allowing it to flow to all corners of the mold such as the refrigerator wall cavity, rise quickly to fill all corners and voids of such a cavity, and cure rapidly.

Accordingly, it is a purpose of this invention to provide a low density rigid foam, having a good K factor, acceptable strength properties, good dimensional stability under various conditions of cold, heat and humidity and wherein the foam forming composition is initially fluid, possesses a low viscosity, and rises rapidly to fill completely a given cavity and cures readily to allow rapid dejigging. In accordance with the present invention, the discovery has been made that the aforementioned difficulties may be overcome and the above purpose achieved by mixing together (a) an addition product of a polyhydric alcohol containing from 3–8 hydroxyl groups, inclusive, with an alkylene oxide containing from 2–4 carbon atoms, inclusive, having a hydroxyl number between about 400 and 600 and an equivalent weight between about 135 and 95; (b) an amine selected from the group consisting of tetra(hydroxyalkyl) alkylene diamines and penta(hydroxyalkyl) alkylene triamines and mixtures thereof having a hydroxyl number between about 650 and 850 and an equivalent weight between about 85 and 65; (c) an organic polyisocyanate; (d) a wetting agent; (e) a blowing solvent; and (f) a catalyst mixture consisting of (1) an amine selected from the group consisting of triethylene diamine and methyl triethylene diamine and (2) an amine selected from the group consisting of dimethylethanolamine, diethylethanolamine, dipropylethanolamine, triethylamine, N-ethyl morpholine, N-methyl morpholine, and N-propyl morpholine whereby foaming takes place due to vaporization of the solvent to produce a rigid polyurethane foam. The following further conditions are observed (I) the over-all NCO/OH equivalent ratio is between about 0.8/1 and 1.3/1; (II) the weight ratio of said polyhydric alcohol addition product (a) to said amine (b) is between about 9/1 and 1/1; (III) the average equivalent weight of the addition product of polyhydric alcohol (a) and the amine (b) combined being between about 80 and 125; and (IV) the catalyst mixture (f) being in an amount of 0.5 to 2.0 percent by weight of A and B combined with the weight ratio of the amine (1) to the amine (2) being from about 2/1 to 1/19 with a preferred ratio 1/1 to 1/3 of amine (1) to amine (2).

The characteristics of the reactants and reaction ratios are critical for accomplishment of the objects of the present invention and production of high quality, rigid polyether-based polyurethane foams according to present invention. Further, it is essential, according to this invention, to employ as catalyst both the amine (1) and amine (2), preferably in the proportion of 1/1 to 1/3 of amine (1) to amine (2).

In the "one-shot" procedure for producing polyurethane foam, all of the reactants are mixed together at once. In the more conventional "premix" type of "one-shot" procedure, the reactants are divided into two components, the polyisocyanate being separated from the glycol or polyol ingredients until the actual mixing.

Whether using the one-shot or premix, the combined reactants after initial mixing, with or without external cooling or heating as desired, are poured into a mold such as a refrigerator wall cavity and allowed to rise freely to full height, usually over a period of several minutes. During or shortly after the mixing of reactants, the temperature of the reaction mixture rises above the boiling point of the blowing solvent, whereby the thus-forming polyurethane expands under the pressure of the entrapped gas and, upon setting, produces a rigid polyurethane foam of exceptionally fine texture. External heat may be applied if necessary. Thus, with a higher-boiling solvent, the reaction mixture may be heated, as in an oven, to cause vaporization thereof. The foams are usually aged or conditioned for a period, e.g., one week at 75 degrees Fahrenheit and 50% relative humidity, at the end of which time essentially all of their ultimate compressive strength is attained. Even after extended aging, e.g., eight weeks at 158° Fahrenheit and 100% relative humidity, the foams produced according to the present invention even with their low core and over-all density show remarkable retention of their desirable compressive strength and low K factor properties as well as good dimensional stability.

The low core and over-all density is achieved by the use of a higher than conventional amount of blowing agent which, in turn, is made possible by the combination of the two classes of amine catalyst referred to above as amine (1) and amine (2).

The foaming formulations for producing foam in accordance with this invention are characterized by low viscosity with superior flow characteristics allowing it to flow to all corners of the mold, such as a refrigerator wall cavity, rise quickly to fill all corners and voids of such a cavity and cure rapidly.

The foams produced according to this invention have a high-closed cell content, low water absorption, and excellent insulation properties.

The following discussion relates in greater detail to the reactants and their characteristics, as well as further additional particulars of the invention.

(a) The polyoxyalkylene addition product of a polyhydric alcohol containing from 3–8 hydroxy groups, inclusive, having a hydroxyl number between about 400 and 600 and an equivalent weight between 135 and 95.

This product may include, for example, derivatives of trimethylolpropane, glycerine, hexanetriol, pentaerythritol, sorbitol, triisopropanolamine, tetra(2-hydroxypropyl)ethylene diamine, sucrose, alpha-methyl glucoside, aniline-formaldehyde condensation products, phenol-formaldehyde condensation products, melamine formaldehyde condensation products, and Bisphenol A epichlorohydrin condensation products. These products are, in general, prepared by the addition of alkylene oxides having from 2–4 carbon atoms to the starting polyol. When different types of alkyleneoxy groups are to be present, these products are made by addition of varying alkylene oxides sequentially to the starting polyol.

Represenative of this reactant are the following:

| | M.W. | E.W. |
|---|---|---|
| Polyoxyethylene derivative of pentaerythritol | 360 | 90 |
| Polyoxypropylene derivative of pentaerythritol | 400 | 100 |
| Do | 540 | 135 |
| Polyoxyethylene derivative of trimethylolpropane | 270 | 90 |
| Polyoxypropylene derivative of trimethylolpropane | 400 | 133 |
| Polyoxypropylene derivative of glycerol | 400 | 133 |
| Polyoxypropylene derivative of hexanetriol | 400 | 133 |
| Polyoxypropylene derivative of sorbitol | 750 | 125 | and numerous other polyoxyalkylene derivatives of polyhydric alcohols having from 3–8 hydroxy groups, inclusive, and the prescribed molecular weight and equivalent weight characteristics.

(b) The tetra(hydroxyalkyl)alkylene diamine and/or penta(hydroxyalkyl)alkylene triamine having a hydroxyl number between about 650 and 850 and an equivalent weight between about 85 to 65 may be, for example, alkylene oxide addition products of ethylene, propylene, butylene, amylene and like diamines, for example the ethylene oxide, propylene oxide or butylene oxide addition products thereof, or compounds in which part of the alkylene oxide addition is with one of the name alkylene oxides and the rest with another of the named alkylene oxides. Any of the compounds produced by these variations may be used provided the hydroxyl number and equivalent weight requirements are met.

Representative compounds are:

| | M.W. | E.W. |
|---|---|---|
| Tetra(hydroxyetyl)amylene diamine | 278 | 70 |
| Tetra(2-hydroxypropyl)ethylene diamine | 292 | 73 |
| Tetra(2-hydroxypropyl)propylene diamine | 306 | 76.5 |
| Tetra(2-hydroxypropyl)butylene diamine | 320 | 80 |
| Tetra(3-hydroxypropyl)ethylene diamine | 292 | 73 |
| Tetra(3-hydroxypropyl)propylene diamine | 306 | 76.5 |
| Tetra(3-hydroxypropyl)butylene diamine | 320 | 80 |
| Di(hydroxyethyl)di(2-hydroxypropyl)ethylene diamine | 264 | 66 |
| Mono(hydroxyethyl)tri(2-hydroxypropyl)ethylene diamine | 278 | 69.5 |
| Penta(hydroxyethyl)diethylene triamine | 390 | 78 | and numerous other having the prescribed characteristics.

(c) Organic polyisocyanate:

Any of a wide variety of organic polyisocyanates (c) may be employed in the reaction, including aromatic, aliphatic and cycloaliphatic diisocyanates and combinations of these types. Representative compounds include aromatic diisocyanates, such as tolylene diisocyanate and m-phenylene diisocyanate. Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate, and alicyclic compounds such as 1,2- and 1,4-cyclohexylene diisocyanates and 4,4′-methylene-bis(cyclohexylisocyanate) are also operable. Arylene diisocyanates, i.e., those in which each of the two isocyanate groups is attached directly to an aromatic ring, react more rapidly with the polymeric glycols or polyols than do the alkylene diisocyanates. The diisocyanates may contain other substituents, although those which are free from reactive groups other than the two isocyanate groups are ordinarily preferred. In the case of the aromatic compounds the isocyanate groups may be attached either to the same or to different rings. Dimers of the monomeric diisocyanates and di(isocyanatoaryl)ureas such as di(3-isocyanato-4-methylphenyl) urea may be used. Additional polyisocyanates which may be employed, for example, include: p,p′-diphenylmethane diisocyanate, 3,3′-dimethyl-4,4′-biphenylene diisocyanate, 3,3′-dimethoxy-4,4′-biphenylene diisocyanate, 3,3′-diphenyl-4,4′-biphenylene diisocyanate, 4,4′-biphenylene diisocyanate, 4-chloro-1,3-phenylene diisocyanate, 3,3′-dichloro-4,4′-biphenylene diisocyanate, triphenylmethane triisocyanate, and 1,5-naphthalene diisocyanate, and other polyisocyanates in a blocked or semi-inactive form such as the bis-phenylcarbamates of tolylene diisocyanate, p,p′-diphenylmethane diisocyanate, p-phenylene diisocyanate, and 1,5-naphthalene and 1,5-tetrahydro-naphthalene diisocyanates.

(d) A wetting agent:

A wetting agent or surface active agent is necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface active agents prepared by the sequential addition of propylene oxide and then ethylene oxide to propylene glycol such as those commercially available under the trademark Pluronic, and the solid or liquid organosilicones have been found particularly desirable. Other surface active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The quantity of surfactant or wetting agent in the reaction mixture is also of significance, although this will vary somewhat depending upon the efficiency of the wetting agent. Generally, from about 0.05 to about 2.0% of surface active agent by weight of total reactants is adequate. Below the lower amounts, the foams have a tendency toward large and uneven cell structure, while more than about 2.0% does not improve foam properties and appears somewhat to decrease foam strength. An optimum appears to be about 0.5% by weight, especially when employing the preferred wetting agents.

The surfactant or wetting agent may in practice be added either to the polyol or isocyanate component without apparent difference in result.

(e) The blowing solvent:

The blowing solvent should be one which is inert to all but soluble or dispersible in at least one of the reactants and insoluble in the final polyurethane foam. The higher the solubility in the reactant or reactants, the lower may be the boiling point of the solvent, which in any case should have a boiling point at one atmosphere of pressure not lower than about −22 degrees Fahrenheit nor higher than about +210 degrees Fahrenheit, preferably not higher than about +120 degrees Fahrenheit, so that it will be vaporized during the polymerization reaction. In general, the halogenated alkane, as well as any other solvent employed either in addition thereto or in addition thereto or in place thereof, should be readily liquefied and of sufficient solubility in the reactant or reactants so that its vapor pressure is considerably reduced to avoid the necessity of utilizing expensive high pressure apparatus. If the gas is relatively insoluble, it should be of such a nature so as to be readily dispersible. Foam expansion will occur when the gas is released by attainment of a temperature well above its boiling point, and this can of course be controlled considerably by removal or non-removal of the exothermic heat. In cases where the heat of reaction is not sufficient to vaporize the solvent employed, external heating will be required.

The halogenated alkanes possess all of the necessary characteristics and are particularly well adapted to be used as blowing solvents with facility. Fluorotrichloromethane, having a boiling point of about 75 degrees Fahrenheit has been found especially suitable as the blowing solvent, and has the advantage, as do many of the halogenated alkanes of the "Freon" or "Genetron" type, of solubility in or compatibility with the glycol or polyol or prepolymer or in the isocyanate component. Representative blowing solvents, including the preferred halogenated alkane solvents, and their boiling points at one atmosphere of pressure are shown in the following Table I.

TABLE I.—REPRESENTATIVE BLOWING SOLVENTS

| Formula | Name or trade name | Mol wt. | B.P., °F. |
|---|---|---|---|
| $CCl_2F_2$ | Freon [1] 12 | 120.9 | −21.6 |
| $CH_3$—$CHF_2$ | 1,1-difluoroethane | 66.1 | −11.2 |
| $C_4F_8$(cyclic) | Freon C-318 | 200 | 21.1 |
| $CClF_2$—$CClF_2$ | Freon 114 | 170.9 | 38.4 |
| $CHCl_2F$ | Freon 21 | 102.9 | 48.1 |
| $CCl_3F$ | Freon 11 | 137.4 | 74.8 |
| $CBrF_2$—$CBrF_2$ | Freon 114B$_2$ | 259.9 | 117.5 |
| $CCl_2F$—$CClF_2$ | Freon 113 | 187.4 | 117.6 |
| $CH_2Cl_2$ | Methylene chloride | 83 | 104 |
| $CCl_4$ | Carbon tetrachloride | 153 | 168 |
| | Isobutane | 58 | 14 |
| | Butane | 58 | 32 |
| | n-Pentane | 72 | 97 |
| | Isopentane | 72 | 82 |
| | Neopentane | 72 | 48 |
| | n-Hexane | 86 | 156 |
| | 2,2-dimethylbutane | 86 | 120 |
| | Heptanes | 100 | From 174.2-209 |

[1] Also corresponding "Genetrons."

It is obvious that blends of such gases, for example a blend of soluble and relatively insoluble gases, may also be combined as the blowing solvent. Blends of the halogenated alkanes with other compatible solvents or gases, such as carbon dioxide, methane, ethane, propane, butanes, pentanes, hexanes, heptanes, propylene, nitrogen, or the like may also be used, by dissolving or dispersing these solvents or gases in the reactant or reactants along with the halogenated alkane. The nonhalogenated alkane solvents or gases may be present alone, but preferably are used in amounts up to about 75% of the solvent mixture. In general and for best foam properties, especially insulating properties, they should not constitute more than 25% of the solvent mixture, the remainder being the halogenated alkane or alkanes.

In practice, the liquefied halogenated alkane and/or other solvent are admixed with the selected reactant or reaction component prior to admixing with the other reactants or reaction component. The outer limits of blowing solvent appear to be from about one to about forty percent, preferably 18 to about 23 percent, based on total weight of reactants and, by varying the amount of solvent together with other minor variations in formulation, foams having densities of from one to twenty pounds or more per cubic foot may be produced, although it should be noted that foams below about 1.2 pounds per cubic foot density have a tendency to shrink when surface skin is cut off of the body of the foam.

(f) The catalyst comprises (1) triethylene diamine of the structure

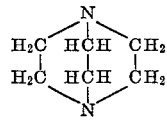

also called diazabicyclo-(2,2,2)-octane or methyl triethylene diamine of the structure

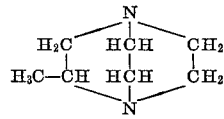

mixed with a tertiary amine (2) selected from the group consisting of diethylethanolamine, dimethylethanolamine, dipropylethanolamine, triethylamine, N-ethyl morpholine, N-methyl morpholine and N-propyl morpholine in the proportion of amine (1) to tertiary amine (2) of 2/1 to 1/19.

The quantity of catalyst employed is generally dependent upon its activity and/or the temperature of the reactants prior to mixing. Obviously, higher reactant temperatures require smaller amounts of catalyst. In general, quantities between about 0.5 to 2.0 weight percent of catalyst based on total weight of polyol component (a) and amine component (b) in the foamable mixture can be used, preferably between about 0.7 and 1.0 weight percent. The catalyst used in the present invention are commercially available materials. The catalysts as commercially obtained are substantially anhydrous stable materials. If desired, however, additional water may be removed by conventional procedures as by vacuum stripping.

Certain reactant ratios and ranges have been found critical in obtaining high-grade rigid foams according to the present invention.

(I) The NCO/OH equivalent ratio of the total reactants should be maintained between about 0.8/1 and 1.3/1, preferably between 0.95/1 and 1.05/1. As the NCO/OH ratio decreases, an increase in tendency toward softness (diminished compressive strength) and shrinkage is observed. This is of course accompanied by a somewhat lower cost. At the other end of the ratio of NCO/OH, the cost is somewhat higher, and a tendency toward diminution of the compressive strength and stability is observed, together with a tendency toward larger cells.

(II) The weight ratio of polyol (a) to the amine component (b) should be maintained between about 9 to 1 and 1 to 1. When this relationship is not observed, the foam characteristics vary undesirably in the same manner as indicated just above.

(III) The average equivalent weight of the polyol (a) and the amine (b) should be between about 80 and 125, preferably between 86 and 102. When operating within this range, rigid polyurethane foams of excellent properties can be prepared. At lower average equivalent weights the foams tend to become friable and brittle and less economical because of the additional polyisocyanate required for stoichiometric balance, while at higher average equivalent weights the foams are more subject to heat distortion, tend to shrink, have lower strength properties, and have a higher percentage of open cells. The average equivalent weight ranges of reactants (a) and (b) are therefore obviously of significance in producing a high grade rigid polyurethane foam of excellent strength and stability characteristics according to the present invention.

It is, however, to be noted that, according to conventional practice in the art, various fillers and flame retardants, and the like, such as carbon black, magnesium carbonate, calcium carbonate, ammonium phosphate, and so on, may be incorporated into the foams of the present invention if desired. These materials are, however, productive of a higher open cell content and diminution of strength characteristics of the foams embodying the same, so it is to be understood that while a particular foam application may require such additaments and while the foam so constituted may still retain much of its superior quality, for greatest strength, closed cell content, and stability, the incorporation of such materials is not recommended.

For the practice of the present invention, various types of apparatus can be used. It is, however, one of the principal advantages of the present invention that simple, commercially available apparatus can be employed. The type of apparatus employed, however, does not constitute a part of the present invention and should not be considered as a limiting feature thereof.

In general, the normal atmospheric temperature, especially when accompanied by the exothermic temperature rise characterizing the polymerization reaction between the isocyanate and other reactants, is adequate to cure the resulting foam within a reasonable time. If desired, however, the curing rate of the finished foam can be accelerated by the application of heat, such as radiant heat to the surface treated.

The following examples illustrate the practice of the instant invention.

EXAMPLE I 100 parts by weight of a propylene oxide-pentaerythritol addition product having a hydroxyl number of 560, 20 parts by weight of N,N,N'N'-tetrakis(2-hydroxypropyl)ethylene diamine, 20 parts by weight of a propylene oxide-diethylene triamine addition product having a hydroxyl number of 715, 0.9 parts by weight of triethylene diamine, also called diazabicyclo(2,2,2)octane, 1.0 parts by weight of dimethylethanolamine, 1.3 parts by weight of a liquid organosilicone surface active agent, and 64.0 parts by weight of trichlorofluoromethane were mixed together to form component A which was mixed with component B, commercially available toluene diisocyanate, and the combined mixture further mixed in a conventional foam machine and poured into a 48-inch high x 12-inch wide x 1½-inch thick plywood mold and allowed to rise in a vertical direction to its full height to produce a foam panel. The over-all NCO/OH equivalent ratio was 1.05/1.0. In this manner a rigid foam having the following properties was produced.

Over-all panel density, lbs./cubic foot _____ 2.1
Panel core density, lbs./cubic foot _____ 1.6
Compressive strength, p.s.i. at yield point:
  R.T. _____ 25
  −20° F. _____ 25
  212° F. _____ 19
Closed cells, percent _____ 90
K factor of 75° F. [B.t.u./(hr.) (sq. ft.) (° F./in.)] _____ 0.110

EXAMPLE II

A mixture prepared in accordance with Example I was mixed in a conventional foam machine and poured into a 26 cubic foot freezer box which generally takes 20 pounds of material of conventional foam formulations to give a complete fill. The foam formulation of Example I filled the cavity completely and weighed only 16 pounds. This was equivalent to an over-all foam density of 2.0 pounds per cubic foot. A conventional foam formulation was then prepared with the exception that more than the normal amount of fluorotrichloromethane was added and, more specifically, in an amount equivalent to the amount used in the formulation of Example I. Seventeen pounds of material were required to fill the box and the K factor was substantially higher than that obtained using the formulation of Example I.

EXAMPLE III

A further foam was produced in exactly the manner of Example I with the exception that 209 parts of polymethylene polyphenylisocyanate was employed as component B in lieu of the 172 parts of tolylene diisocyanate. 2-foot x 2-foot x 2-inch panels were prepared from this foam formulation in the same manner as the panels of Example I and had the following properties:

Over-all panel density, lbs./cu. ft. _____ 2.45
Core density of panel, lbs./cu. ft. _____ 1.64
Compressive strength, p.s.i. at yield point:
  R.T. _____ 20.8
  212° F. _____ 16.0
Closed cells, percent _____ 90
K factor at 75° F. _____ 0.115

EXAMPLE IV

A further foam was produced in exactly the manner of Example I except that in component A, the propylene oxide adduct of 560 hydroxyl number was replaced by a propylene oxide-pentaerythritol addition product having a hydroxyl number of 500, and 159 parts of the tolylene diisocyanate was employed instead of 172 parts. Panels of foam were made in accordance with Example I which had the following properties:

Over-all panel density, lbs./cu. ft. _____ 2.1
Panel core density, lbs./cu. ft. _____ 1.62
Compressive strength, p.s.i. at yield point:
  R.T. _____ 22
  −20° F. _____ 23
  212° F. _____ 17
Closed cells, percent _____ 91
K factor at 75° F. _____ 0.115

EXAMPLE V

A further foam was produced in the same manner as Example I except that in component A, a propylene oxide-pentaerythritol adduct having a hydroxyl number of 600 was employed in lieu of the adduct having a hydroxyl number of 560, and 180 parts of component B was employed in lieu of 172 parts. Panels were prepared exactly as in Example I which had the following properties:

Over-all panel density, lbs./cu. ft. _____ 2.15
Panel core density, lbs./cu. ft. _____ 1.63
Compressive strength, p.s.i. at yield point:
  R.T. _____ 27
  −20° F. _____ 27
  212° F. _____ 22
Closed cells, percent _____ 92
K factor at 75° F. _____ 0.110

EXAMPLE VI

A further foam was produced in exactly the manner of Example I except that in component A, 40 parts of N,N,N'N' - tetrakis(2 - hydroxypropyl)ethylene diamine was employed as the only amine-based polyol. Further, 174 parts of component B was employed instead of 172 parts. A rigid foam was prepared in exactly the manner of Example I which had the following properties:

Over-all panel density, lbs./cu. ft. _____ 2.2
Panel core density, lbs./cu. ft. _____ 1.63
Compressive strength, p.s.i. at yield point:
  R.T. _____ 24
  −20° F. _____ 26
  212° F. _____ 18
Closed cells, percent _____ 89
K factor at 75° F. _____ 0.109

EXAMPLE VII

A further foam was produced in exactly the manner of Example I with the exception that 40 parts of the propylene oxide-diethylene triamine addition product, having a hydroxyl number of 715, was employed as the only amine polyol, i.e., no N,N,N'N'-tetrakis(2-hydroxypropyl)-ethylene diamine was employed. A rigid foam panel was prepared as described in Example I with the following properties:

| | |
|---|---|
| Over-all panel density, lbs./cu. ft. | 2.05 |
| Panel core density, lbs./cu. ft. | 1.59 |
| Compressive strength, p.s.i. at yield point: | |
| R.T. | 27.5 |
| −20° F. | 28 |
| 212° F. | 18 |
| Closed cells, percent | 91 |
| K factor at 75° F. | 0.108 |

EXAMPLE VIII

An additional foam was produced in exactly the manner of Example I with the exception that 147 parts of component B was employed. The foam which was prepared had the following properties:

| | |
|---|---|
| Over-all panel density, lbs./cu. ft. | 2.05 |
| Panel core density, lbs./cu. ft. | 1.55 |
| Compressive strength, p.s.i. at yield point: | |
| R.T. | 22 |
| −20° F. | 23 |
| 212° F. | 15 |
| Closed cells, percent | 90 |
| K factor at 75° F. | 0.112 |

EXAMPLE IX

An additional foam was produced in exactly the manner of Example I with the exception that 196 parts of component B was employed. The properties of the rigid foam were as follows:

| | |
|---|---|
| Over-all panel density, lbs./cu. ft. | 2.2 |
| Panel core density, lbs./cu. ft. | 1.63 |
| Compressive strength, p.s.i. at yield point: | |
| R.T. | 26 |
| −20° F. | 28 |
| 212° F. | 23 |
| Closed cells, percent | 90 |
| K factor at 75° F. | 0.115 |

EXAMPLE X

An additional foam is produced in exactly the manner of Example I with the exception that 1.0 part of triethylamine is employed in lieu of dimethylethanolamine. A rigid foam having an over-all panel density of 2 pounds per cubic foot, a compresive strength at room temperature of 25, 90 percent closed cells and a K factor of 0.105 is produced.

EXAMPLE XI

An additional foam is produced in exactly the manner of Example I with the exception that 1.0 part of N-methyl morpholine was employed in lieu of dimethylethanolamine. A rigid foam having an over-all panel density of 2 pounds per cubic foot, a compressive strength at room temperature of 25, 90 percent closed cells and a K factor of 0.115 is produced.

While there has been shown and described hereinabove the present preferred embodiments of this invention, it is to be understood that various changes, alterations and modifications can be made thereto without departing from the spirit and scope thereof as defined in the appended claims.

What is claimed is:

1. A method of preparing a stable rigid polyether-based polyurethane foam which comprises mixing (a) an addition product of a polyhydric alcohol containing from 3 to 8 hydroxyl groups inclusive with an alkylene oxide containing from 2 to 4 carbon atoms inclusive having a hydroxyl number between about 400 and 600 and an equivalent weight between about 135 and 95; (b) an amine selected from the group consisting of tetra(hydroxyalkyl)alkylenediamines and penta(hydroxyalkyl)alkylenetriamines and mixtures thereof having a hydroxyl number between about 650 and 850 and an equivalent weight between about 85 and 65; (c) an organic polyisocyanate; (d) a wetting agent; (e) a blowing solvent; and (f) a catalyst mixture consisting of (1) an amine selected from the group consisting of triethylene diamine and methyl triethylene diamine and (2) an amine selected from the group consisting of diethylethanolamine, dimethylethanolamine, dipropylethanolamine, triethylamine, N-ethyl morpholine, N-methyl morpholine, and N-propyl morpholine whereby foaming takes place due to vaporization of the solvent to produce a stable, rigid polyether-based polyurethane foam, the following further conditions being maintained; (I) the over-all NCO/OH equivalent ratio being between about 0.8/1 and 1.3/1; (II) the weight ratio of said polyhydric alcohol addition product (a) to said amine (b) being between about 9/1 and 1/1; (III) the average equivalent weight of said addition product of a polyhydric alcohol (a) and said amine (b) combined being between about 80 and 125 and (IV) said catalyst mixture (f) being in an amount of about 0.5 to 2.0 percent of the total weight of components (a) and (b) and the weight ratio of amine (1) to amine (2) is from about 2/1 to 1/19.

2. The method of claim 1 wherein said addition product of a polyhydric alcohol (a) is a propylene oxide pentaerythritol addition product having a hydroxyl number of 550 and an equivalent weight of 100.

3. The method of claim 1 wherein said amine (b) is N,N,N',N'-tetrakis(2-hydroxypropyl)ethylene diamine.

4. The method of claim 1 wherein said amine (b) is a propylene oxide-diethylene triamine addition product having a hydroxyl number of 715 and an equivalent weight of 78.

5. The method of claim 1 wherein said amine (b) is a mixture of N,N,N',N'-tetrakis(2-hydroxyproyl)ethylene diamine and a propylene oxide-diethylenetriamine addition product having a hydroxyl number of 715 and an equivalent weight of 78.

6. The method of claim 1 wherein components (a), (b), (d), (e) and (f) are mixed together to form one solution and the organic polyisocyanate (c) is then added to said solution.

7. The method of claim 1 wherein the organic polyisocyanate is tolylene diisocyanate.

8. The method of claim 1 wherein the blowing solvent is trichlorofluoromethane.

9. The product produced by the method of claim 1.

References Cited

UNITED STATES PATENTS

| | | | |
|---|---|---|---|
| 2,888,411 | 5/1959 | Pace | 260—2.5 |
| 3,091,551 | 5/1963 | Robertson | 117—105.5 |
| 3,234,153 | 2/1966 | Britain | 260—2.5 |

OTHER REFERENCES

Alzner et al.: I. & E.C., vol. 51, No. 5, pp. 715–716; Effect of Catalysts on Urethane Foam Properties, May 1959.

Saunders et al.: Polyurethanes, Chemistry and Technology, vol. 2, pp. 196, 199, 200, 217–219.

DONALD E. CZAJA, Primary Examiner

MICHAEL B. FEIN, Assistant Examiner

U.S. Cl. X.R.

161—190